United States Patent [19]

Seperant

[11] Patent Number: 5,056,048
[45] Date of Patent: Oct. 8, 1991

[54] INTEGRATED DIGITAL STANDARDIZED PRECISION THERMOMETER

[76] Inventor: Horst Seperant, P.O. Box 839, 73 Plympton Rd., Sudbury, Mass. 01776

[21] Appl. No.: 381,487

[22] Filed: Jul. 18, 1989

[51] Int. Cl.[5] .................. G01K 1/14; G06F 15/20
[52] U.S. Cl. .................... 364/557; 374/170; 128/736
[58] Field of Search ............ 364/557, 571.01; 374/170, 172, 114; 128/736; 341/167

[56] References Cited

U.S. PATENT DOCUMENTS

| | | | |
|---|---|---|---|
| 3,942,123 | 3/1976 | Georgi | 341/167 |
| 4,133,208 | 1/1979 | Parlanti | 341/167 |
| 4,536,851 | 8/1985 | Germanton et al. | 374/170 |
| 4,634,294 | 6/1987 | Christol et al. | 364/557 |
| 4,691,713 | 9/1987 | Suzuki | 128/736 |
| 4,797,840 | 1/1989 | Fraden | 364/557 |
| 4,813,790 | 3/1989 | Frankel et al. | 374/170 |
| 4,832,599 | 5/1989 | Kung | 128/736 |
| 4,838,707 | 6/1989 | Ozawa et al. | 374/170 |
| 4,843,577 | 6/1989 | Muramoto | 364/557 |
| 4,866,621 | 9/1989 | Ono | 364/557 |
| 4,930,222 | 6/1990 | Nakanishi et al. | 374/170 |

Primary Examiner—Parshotam S. Lall
Assistant Examiner—Ellis B. Ramirez
Attorney, Agent, or Firm—Iandiorio & Dingman

[57] ABSTRACT

An integrated standardized digital precision thermometer has a sheath including a temperature sensing element and a handle physically interconnected with the sheath and housing an integrated digital standardized thermometer circuit, including a analog to digital converter responsive to the temperature sensing element for converting an analog signal representative of the resistance of the sensing element to a digital signal representative of the resistance of the sensing element; and a microcomputer responsive to the digital signal representative of the resistance of the sensing element for converting the digital signal representative of the resistance of the sensing element to a standardized temperature scale.

18 Claims, 8 Drawing Sheets

INTEGRATED DIGITAL STANDARDIZED PRECISION THERMOMETER

FIELD OF INVENTION

This invention relates to an integrated digital standardized precision thermometer, and more particularly to such a thermometer which provides precision standardized readings in digital form employing circuits which are all housed in the handle of the probe.

BACKGROUND OF INVENTION

With respect to the measurement of temperature, the world is at present governed by the IPTS-68 (International Practical Temperature Scale of 1968) scale. This scale defines certain "fixed points", such as the triple point of water (0.01 degree C.), the boiling point of water (100 degrees C.), etc., and then specifies a means of interpolating between these fixed points by using an SPRT (Standard Platinum Resistance Thermometer) together with a set of defining equations which allow the relationship of SPRT resistance versus SPRT temperature to be used to derive all other temperatures which are in between the fixed points.

Prior to the IPTS-68, the IPTS-48 (1948) was used to define temperature worldwide. On Jan. 1, 1990, a new scale, known tentatively as the ITS-90 (International Temperature Scale of 1990) is scheduled to supersede the IPTS-68. In the USA, all IPTS-68 calibrations are traceable to the National Institute of Standards and Technology (NIST), formerly known as the National Bureau of Standards (NBS).

At present, precision temperature measurements are made in a very cumbersome way.

First, a temperature probe is calibrated against the IPTS-68, either directly (primary calibration) by using fixed points and defining equations, or indirectly (secondary calibration) by comparing it against a previously calibrated SPRT. The temperature probe under calibration is then characterized with regard to its resistance value and change of that value versus applied temperature. This information is recorded on a Calibration Certificate. The probe is now said to have been calibrated.

Second, the user now obtains a precision resistance measuring device such as an ohmmeter which has its own Calibration Certificate and is quite expensive. The probe is now connected to the resistance measuring device and the value of resistance is recorded. This is done by a skilled technician and takes considerable time.

Third, the recorded value of resistance is now converted to the appropriate temperature scale (IPTS-48, IPTS-68 or ITS-90), and units (degrees C, F, K) which is tedious and error prone. Oftentimes this is still done by hand, using "look-up tables" and manual interpolations and calculations.

Even with present state-of-the-art equipment where the resistance measuring device has the required intelligence to read the probe resistance directly in temperature, a minimum of two error and uncertainty sources exist, the probe calibration uncertainty and the uncertainty of the resistance measuring device. Needless to say, these devices are bulky, difficult to operate and cost up to ten times as much as the probe itself.

SUMMARY OF INVENTION

It is therefore an object of this invention to provide an integrated digital standardized precision thermometer.

It is a further object of this invention to provide such a standardized precision thermometer which eliminates a step in the normal calibration process.

It is a further object of this invention to provide such a standardized precision thermometer which presents the temperature directly in digital form.

It is a further object of this invention to provide such a standardized precision thermometer in which the temperature in digital form is fully corrected, compensated, calibrated and scaled to the appropriate units of temperature.

It is a further object of this invention to provide such a standardized precision thermometer which requires little or no operator skill.

It is a further object of this invention to provide such a standardized precision thermometer which is much less expensive, faster and much more compact.

It is a further object of this invention to provide such a standardized precision thermometer which does not require the calibration step involving a precision ohmmeter.

This invention results from the realization that a completely integrated digital standardized precision thermometer which provides a digital representation of sensed temperature fully corrected, calibrated, compensated, scaled and with appropriate units, meeting international temperature standards, can be achieved with a microcomputer and analog to digital converter all housed in the handle of a temperature probe and interconnected with a temperature sensing element in the tip of the probe sheath.

This invention features an integrated digital standardized precision thermometer including a sheath and a handle. The sheath includes a temperature sensing element, and the handle is physically interconnected with the sheath and houses an integrated digital standardized thermometer circuit. The integrated digital standardized thermometer circuit includes an analog to digital converter responsive to the temperature sensing element for converting an analog signal representative of the resistance of the sensing element to a digital signal representative of the resistance of the sensing element, and a microcomputer responsive to the digital signal representative of the resistance of the sensing element for converting the digital signal representative of the resistance of the sensing element to a standardized temperature scale.

In a preferred embodiment, the analog to digital converter includes a dual slope integrator and means for determining the period of the dual slope output. The analog to digital converter may also include a buffer circuit having means for measuring a signal across a ratiometric circuit for compensating for current changes through the temperature sensing element. The buffer circuit may also include means for measuring the signal across the terminals and conductors interconnecting the thermometer circuit and the temperature sensing element to determine parasitic thermoelectric errors in the terminals and conductors. The buffer circuit may also have means for measuring the signal representative of the ambient temperature of the standardized thermometer circuit in the handle for determining temperature drift. The microcomputer may include means for enabling the analog to digital converter to begin the dual slope period. The microcomputer may also include means for accumulating a count during the period of the slope. The microcomputer may also include means for linearizing the output of the analog to digital converter, means for calibrating the analog to digital converter for zero and full span, and means responsive to the signal representative of the ambient temperature for correcting for the zero and span drift of the analog to digital converter. The microcomputer may also include means for storing the coefficient of correction for the temperature sensing element and means for storing the identification or address of the integrated digital standardized precision thermometer.

The temperature sensing element may be a platinum wire, and the handle may be approximately in the range of two to eight inches long and three-quarters of an inch to three inches in width. The microcomputer may include a digital communications interface which includes a digital interface connector. The digital interface connector may include an RS-232C connector and the microcomputer may include means for converting the sensed temperature into one of a number of predetermined units of temperature.

DISCLOSURE OF PREFERRED EMBODIMENT

Other objects, features and advantages will occur to those skilled in the art from the following description of a preferred embodiment and the accompanying drawings, in which.

Figure 1:
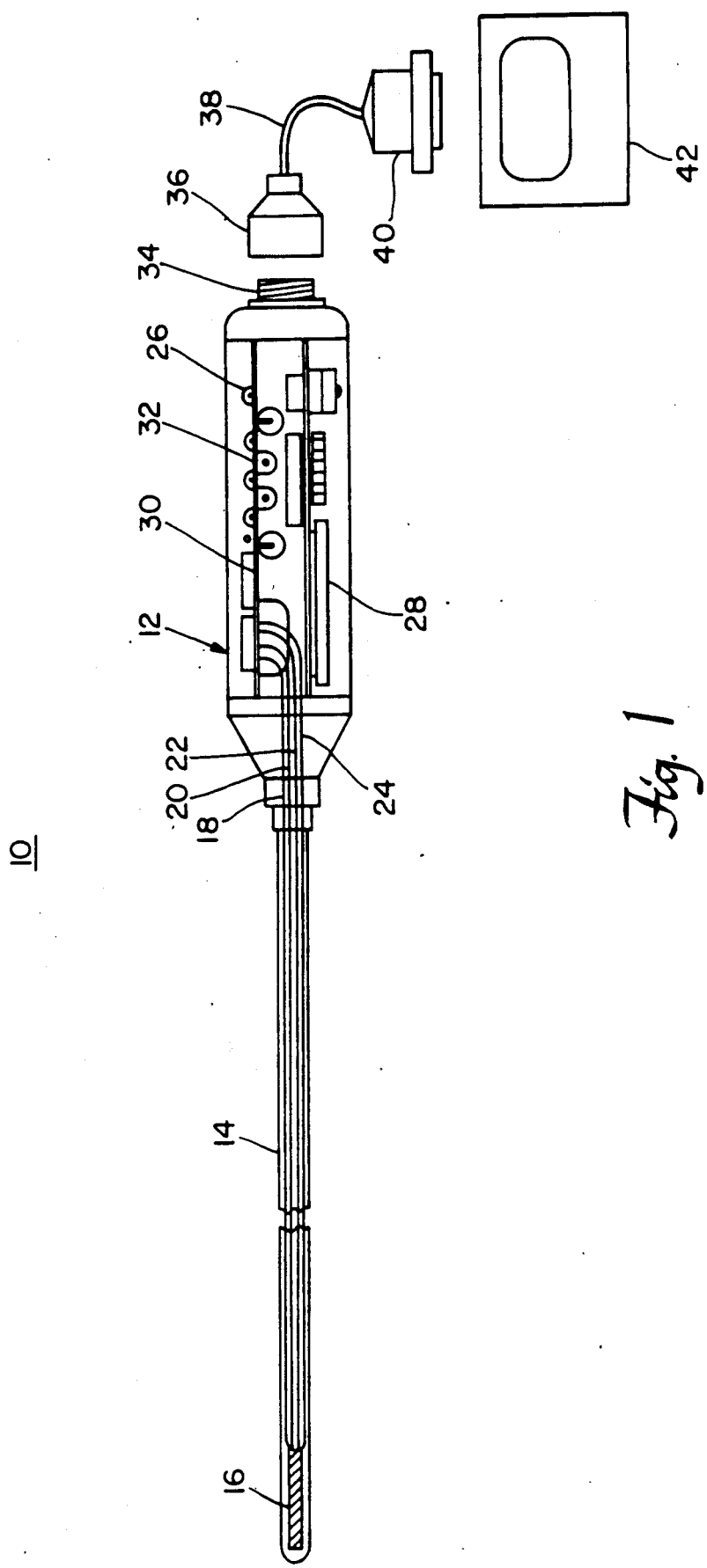
FIG. 1 is a side elevational schematic view with parts broken away of an integrated digital standardized precision thermometer according to this invention.

There is shown in FIG. 1 an integrated standardized digital precision thermometer 10 including a handle 12 and sheath 14. A temperature sensing element 16, which can be, for example, a platinum wire such as used in a Standard Platinum Resistance Thermometer, is connected by four wires 18, 20, 22 and 24, which are connected to the integrated digital standardized thermometer circuit 26 housed wholly within handle 12. Circuit 26 includes a microcomputer 28, an A/D converter 30, power supply 32, and an interface connector 34 at which is provided a digital representation of the sensed temperature, fully corrected, calitrated, compensated and scaled, and in appropriate temperature units meeting international temperature standards. Connector 34 may be interconnected with a mating connector 36 having a cable 38 and a digital interface connector 40 which provides communications signals according to standard interface protocols, such as an RS-232C, for interconnection with a display 42.

Figure 2:
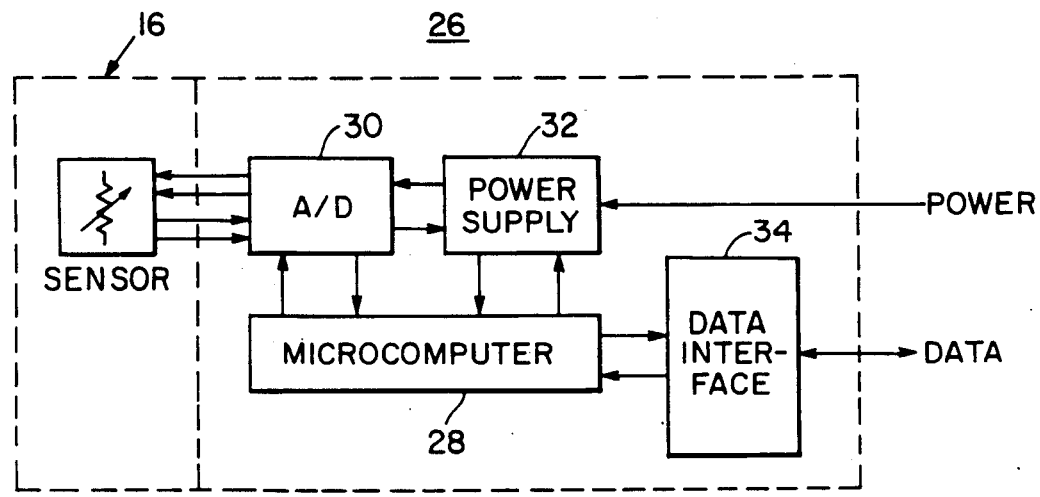
FIG. 2 is a block diagram of the thermometer circuit of FIG. 1.

Integrated digital standardized thermometer circuit 26 is shown in more detail in FIG. 2, along with sensor 16, where it can be seen that power supply 32 receives external power distributed to A/D converter 30 and microcomputer 28. Microcomputer 28 provides digital data to interface connector 34.

Figure 4:
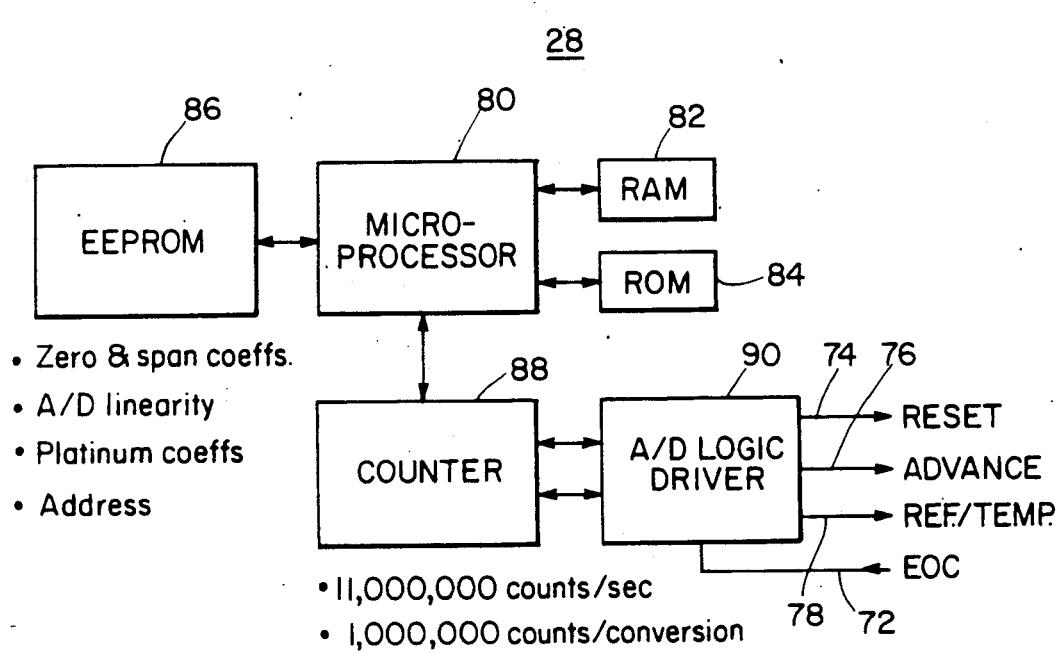
FIG. 4 is a block diagram of the microcomputer of FIG. 2.
Figure 3:
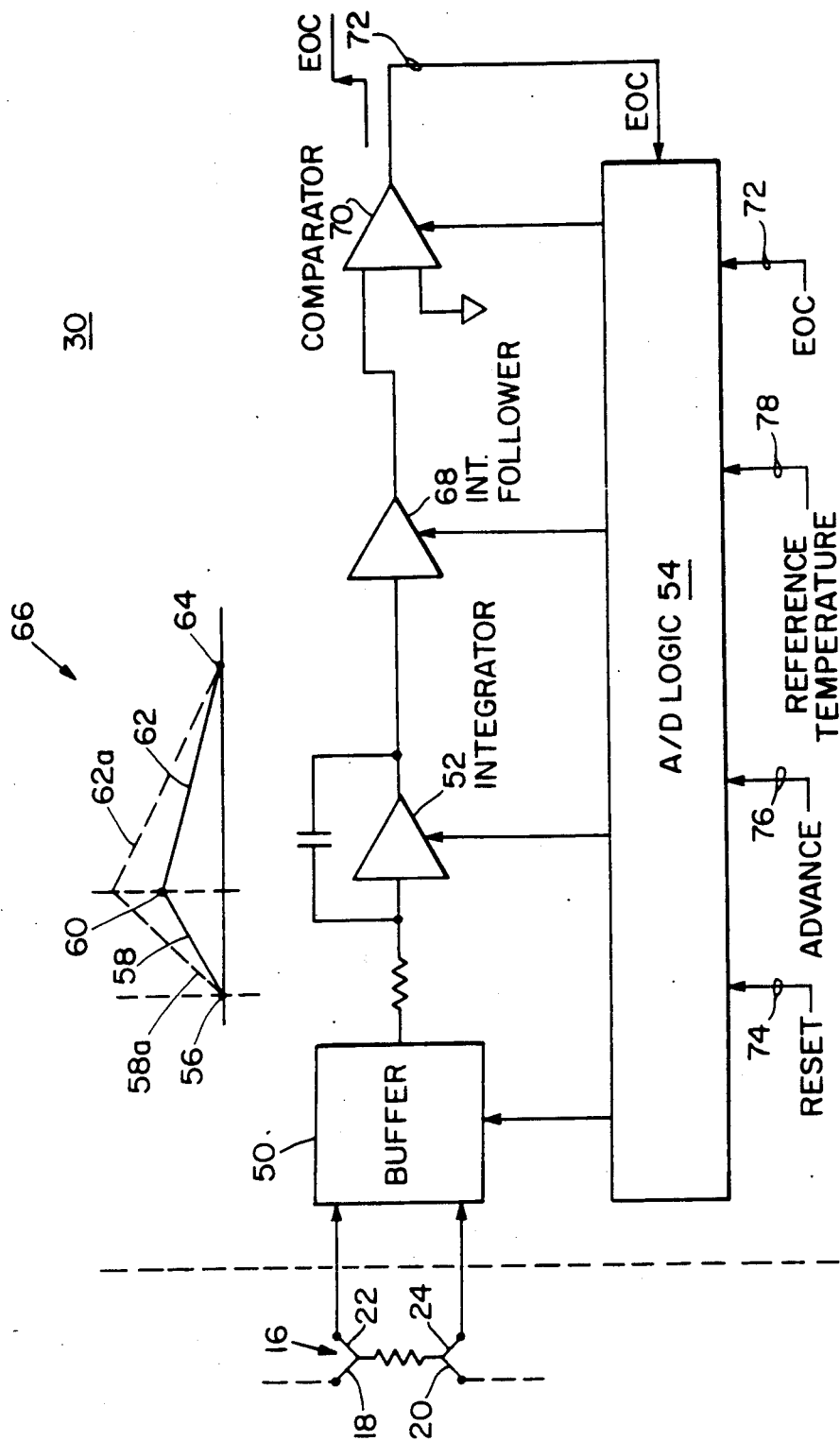
FIG. 3 is a block diagram of the analog to digital converter of FIG. 2.

Analog to digital converter 30 includes a buffer 50, FIG. 3, which receives a signal from temperature sensing element 16 representative of the resistance of element 16, which in turn is a function of the temperature to which element 16 is being subjected. From buffer 50 the signal is delivered to integrator 52, which is a dual slope integrator. Upon a signal from A/D logic 54, integrator 52 begins at point 56 to integrate a ramp function whose slope depends upon the magnitude of the signal from buffer 50. The greater the amplitude of the signal, the steeper is the slope of ramp 58. After a predetermined time at point 60 under control of A/D logic 54, integrator 52 ceases integrating and the ramp function is reversed. At this point a second predetermined ramp 62 is developed. When that ramp reaches zero at point 64 integrator 52 stops integrating. The dual-slope signal 66 is submitted to integrator follower 68, where the slopes of both ramps 58 and 62 are increased by as much as a factor of 100 to 1, as indicated only illustratively by the dashed ramps 58a and 62a. The increased steepness of these two ramps increases the certainty of detection of the zero crossing point 64. The output from integrator follower 68 is delivered to comparator 70, which provides an end-of-conversion (EOC) signal when the zero crossing at 64 occurs. This signal is fed back to A/D logic 54. When A/D logic 54 receives the EOC signal, it immediately retransmits that signal to microcomputer 28. Microcomputer 28 in return sends to the A/D logic 54 the reset signal which resets integrator 52, integrator follower 68, and comparator 70, and sets buffer 50 to zero. Upon receipt of the next advance signal from microcomputer 28, the A/D logic signals integrator 52 and buffer 50 to begin the dual-slope function once again. The third input signal to A/D logic 54, labelled reference temperature, instructs buffer 50 as to whether to sense the temperature at the temperature-sensing element 16, or signals representing the ambient temperature in handle 12 where circuit 30 is located, or a signal representative of the parasitic thermoelectric error in the terminals and conductors of temperature-sensing element 16. The EOC signal 72, reset signal 74, advance signal 76 and reference temperature signal 78 are provided by a microcomputer 28, FIG. 4, which includes a microprocessor 80, RAM 82, ROM 84, and electrically erasable PROM 86 (EEPROM). Microprocessor 80 enables counter 88 to begin counting when the advance signal 76 is triggered from A/D logic driver 90. The counter is stopped by a signal from driver 90 upon the receipt of EOC signal 72. Counter 88 has a capacity of 1,000,000 bits and counts at the rate of 11,000,000 bits per second. Thus, during the dual-slope period or cycle, counter 88 can accumulate a count of 1,000,000. EEPROM 86 stores the coefficients for effecting A/D calibration for zero and "span" (full scale deflection), for A/D self-correction for linearity; and for the characteristic correction of a platinum wire or other temperature-sensing element. If more than one thermometer 10 is going to be used simultaneously, EEPROM 86 can also store an identity or address by which this particular thermometer 10 can be addressed from a master system.

Figure 5:
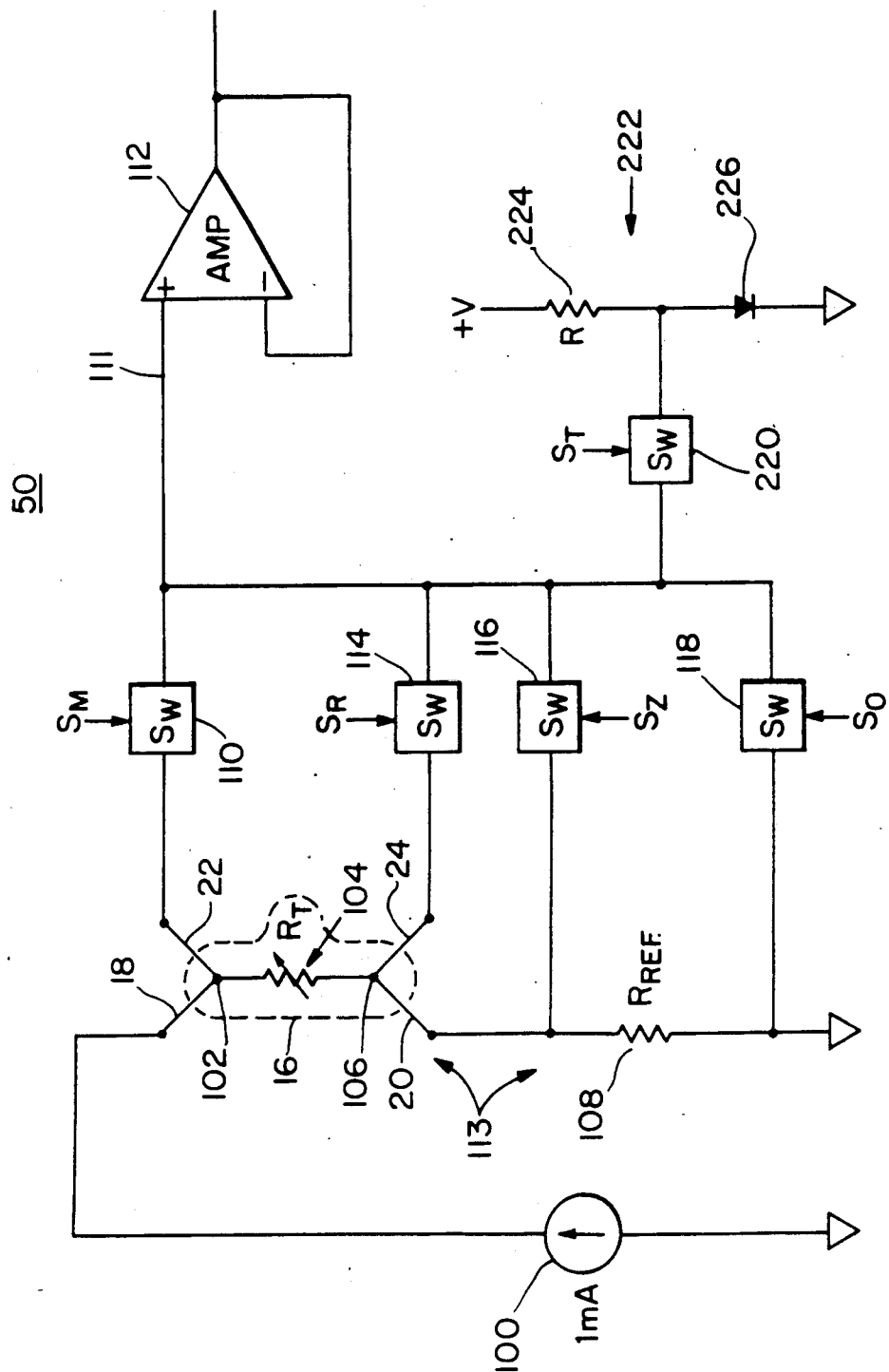
FIG. 5 is a schematic diagram of the buffer circuit of FIG. 3.

Buffer 50 is shown in greater detail in FIG. 5. Constant current DC generator 100 provides one milliamp through conductor 18 and junction 102 to temperature sensing element 16, which may, for example, be a temperature sensing resistance or flat wire 104. The current flows out through lower junction 106, then through reference resistor 108 to ground. Buffer 50 also includes a plurality of switches such as switch 110 which interconnects one input of amplifier 112 and upper junction 102 of platinum wire 104. Switch 114 interconnects lower junction 106 of platinum wire 104 with terminal 111 of amplifier 112. Switch 116 interconnects platinum wire 104 through lower junction 106 and conductor 20 to terminal 111 of amplifier 112, and switch 118 interconnects ground with terminal 111 of amplifier 112. Switch 220 interconnects a temperature sensing resistor diode network 222 consisting of resistor 224 and diode 226 to the same input terminal 111 of amplifier 112. When switch 110 receives signal $S_M$, switch 110 closes and connects junction 102 with terminal 111, thereby providing an output representative of the voltage across temperature-sensing element 16, junction 106, conductor 20, and reference resistor 108. Upon receipt of signal $S_R$, switch 114 closes and connects to terminal 111, conductor 24, junction 106, conductor 20 and resistor 108. When switch 116 receives signal $S_Z$, the voltage across reference resistor 108 is available to terminal 111. When switch 118 receives signal $S_o$, ground is connected to terminal 111. Thus, the voltage developed in response to $S_M$ has subtracted from it the voltage developed from $S_R$, the error introduced by the inclusion of resistor 108, and the parasitic thermoelectric error caused by the junction 106 and conductor 20, so that a signal free of those errors can be delivered to amplifier 112. There is a second benefit to be derived from buffer circuit 50. That is, the one milliampere current delivered from constant current generator 100 flows through both resistance wire 104 and reference resistor 108. Thus if the one milliampere current should change slightly through resistance wire 104, the same current change is reflected through resistor 108. Since the voltage generated by this current in resistor 108 is applied to terminal 111 as an error correction for the voltage sensed across wire 104, any change in the current is compensated for automatically in the same ratio so that the corrected voltage out of amplifier 112 remains the same even though the current may have changed. If this ratiometric circuit 113 configuration of resistor 108 and resistance wire 104 were not used, a slight change in the one milliampere current, of 0.01 ma, would constitute a 1% change in the current, which would result in a 1% error in the reading. This is intolerable for the precision standardized application of this instrument, which requires precision to a level of 0.001 degree Celsius. Voltage divider system 222 associated with switch 220, is located in the handle 12 in order to sense the ambient temperature in and around the thermometer circuit 26, which occurs when switch 220 receives the signal $S_T$.

Figure 6:
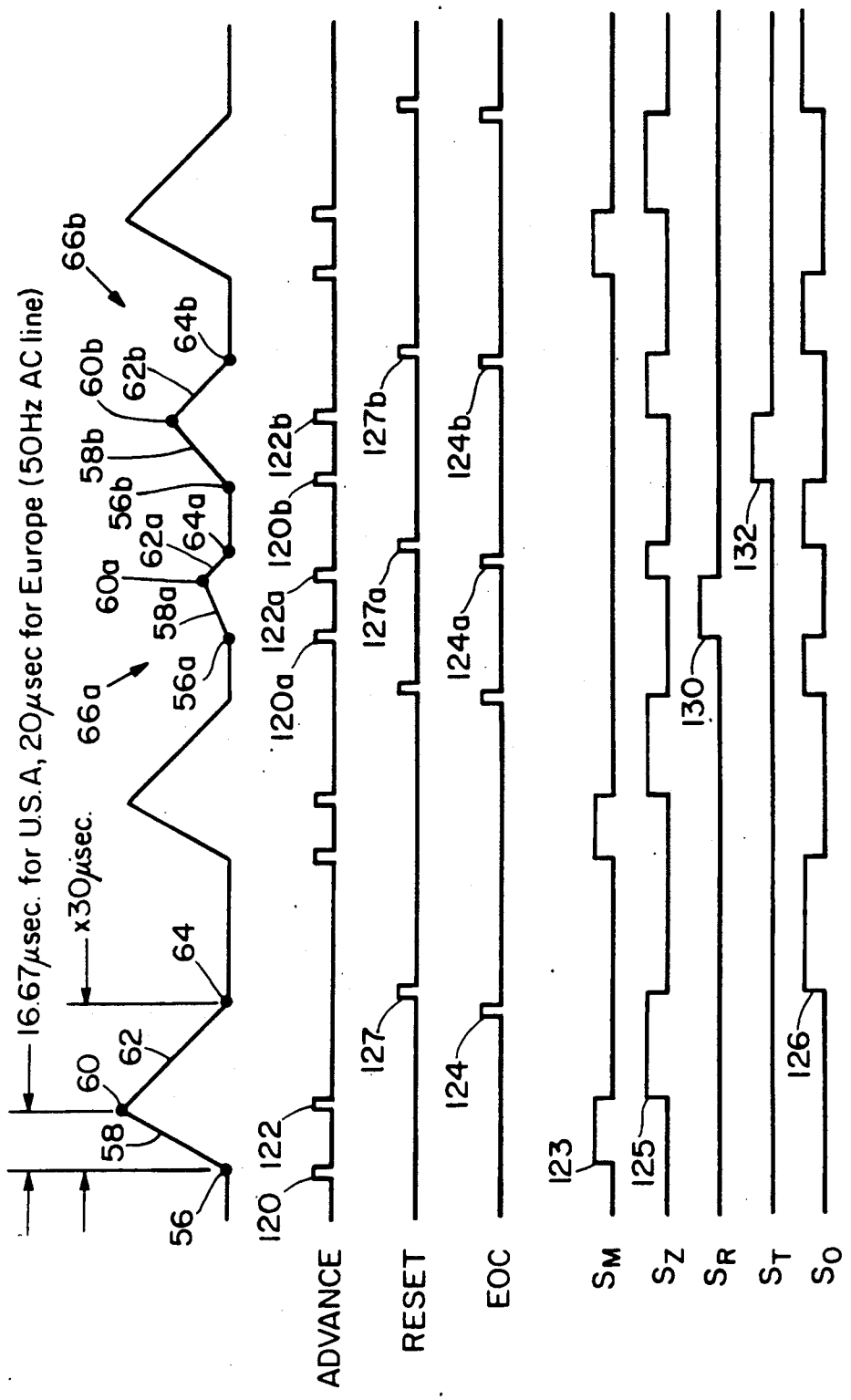
FIG. 6 is a diagram showing the timing of signals and switches in FIGS. 4 and 5, respectively.

In operation, an advance signal 120, FIG. 6, is sent to A to D logic 54, FIG. 3. Integrator 52 is enabled to begin integrating starting at point 56, FIG. 6. The ramp continues until a second advance signal 122 is delivered. Under European convention this would be a 20 millisecond interval; under U.S. convention it would be a 16.67 millisecond interval. At the same time, signal $S_Z$ develops a pulse 125 to close switch 116 and reduce the voltage on terminal 111. At time 60 the ramp slope is reversed, and when ramp 62 finally crosses the zero line at 64 an end of conversion (EOC) pulse 124 is delivered on line 72 to A/D logic 54, which forwards it to microcomputer 28. At that point microcomputer 28 also provides a pulse 126 sending signal $S_o$ to switch 118. This provides a zero level between dual-slope ramp functions. Simultaneously with advance signal 120, signal $S_M$ develops a pulse 123 to close switch 110 and connect the voltage from resistance wire 104 to terminal 111 of amplifier 112.

The reset signal 74 develops pulse 127 shortly after zero crossing 64 which resets buffer 50, integrator 52, integrator follower 58, and comparator 70. The cycle repeats itself continuously. Periodically, when signal $S_R$ is supplied, a pulse 130 closes switch 114 and causes advance pulse 120a to begin to enable integrator 52 to begin the ramp 58a driven by the parasitic thermoelectric voltage. This value, after being calculated, is stored in the microcomputer and is referred to repeatedly to correct the resistance value which is sensed for platinum wire 104. Also, periodically, when signal $S_T$ develops a pulse 132, switch 220 is closed so that integrator 52 is enabled to ramp up on the output of temperature sensing circuit 222 in order to ascertain the actual ambient temperature in and around circuit 26 in handle 12. This value would then be referred to by the microcomputer to correct the resistance/temperature reading. A typical dual-ramp cycle for voltage divider 222 when switch 220 is closed is shown at 66b.

Figure 7:
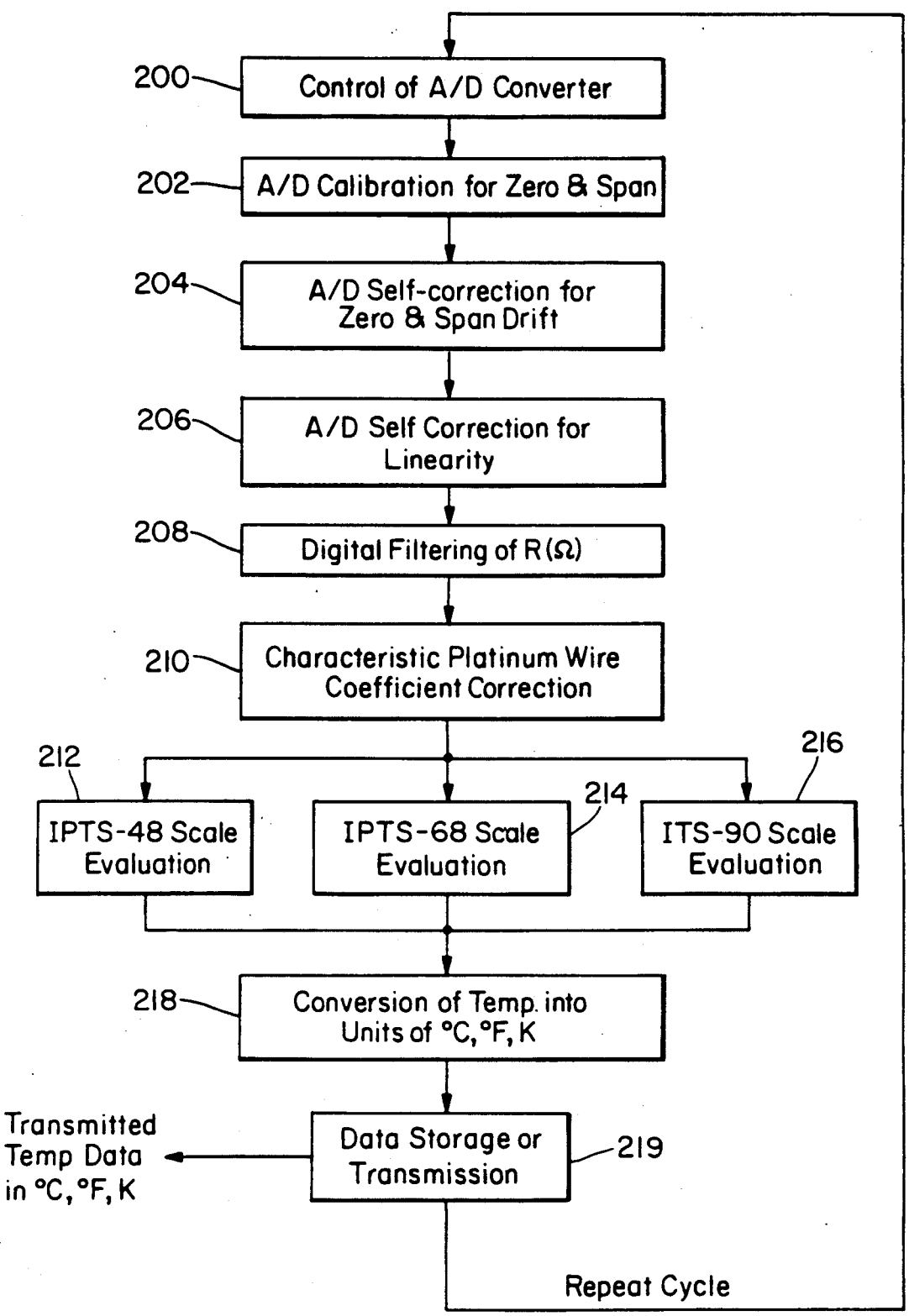
FIG. 7 is a flow chart illustrating the programming and function of the microcomputer of FIG. 4.

In operation, microcomputer 28 first controls A/D converter 52 starting with advance signal 76 to begin the next sample. Then the microcomputer reverts and begins signal processing for the previous sample, step 200, FIG. 7.

Figure 8:
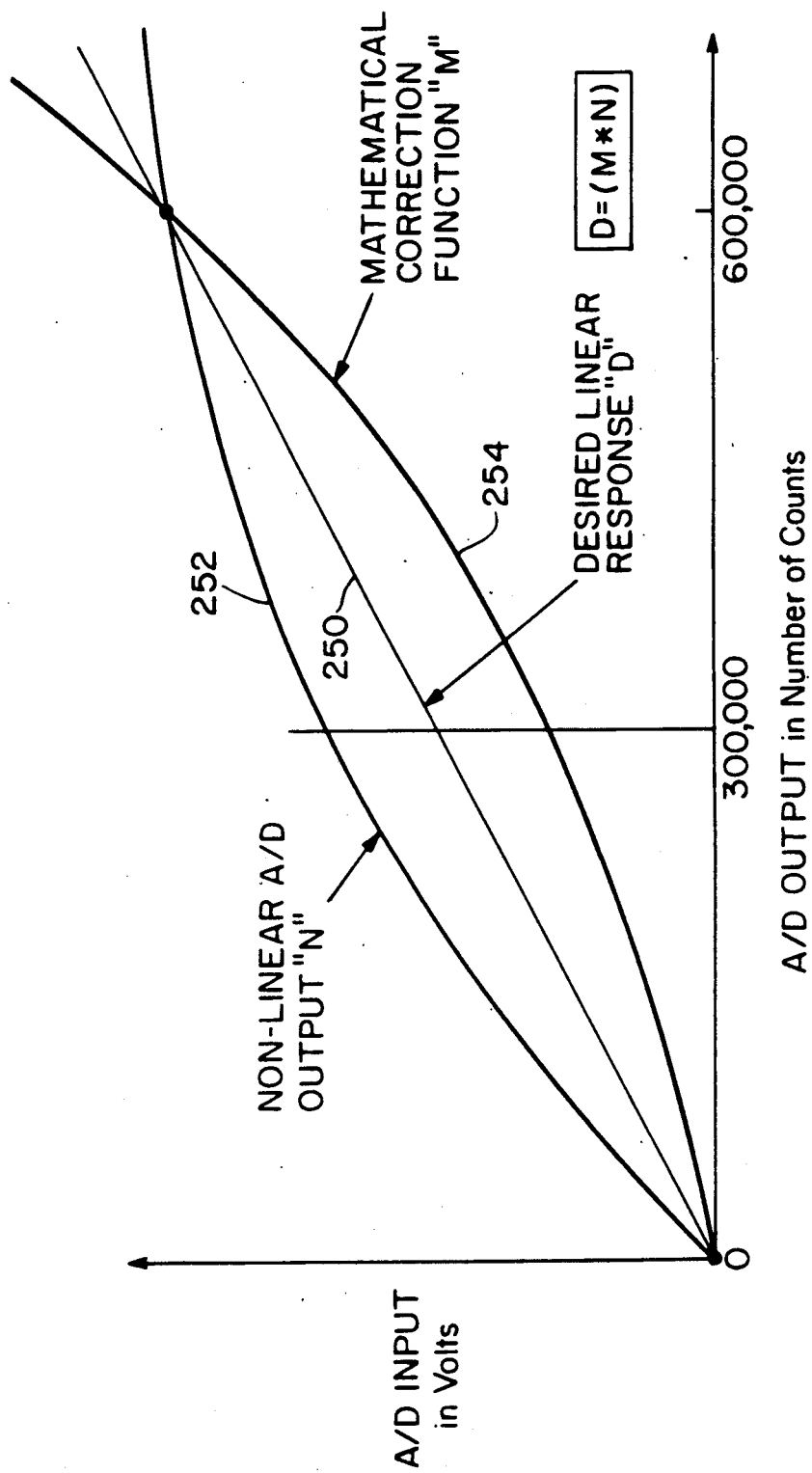
FIG. 8 is a graph illustrating the analog to digital converter linearity error and compensation.
Figure 9:
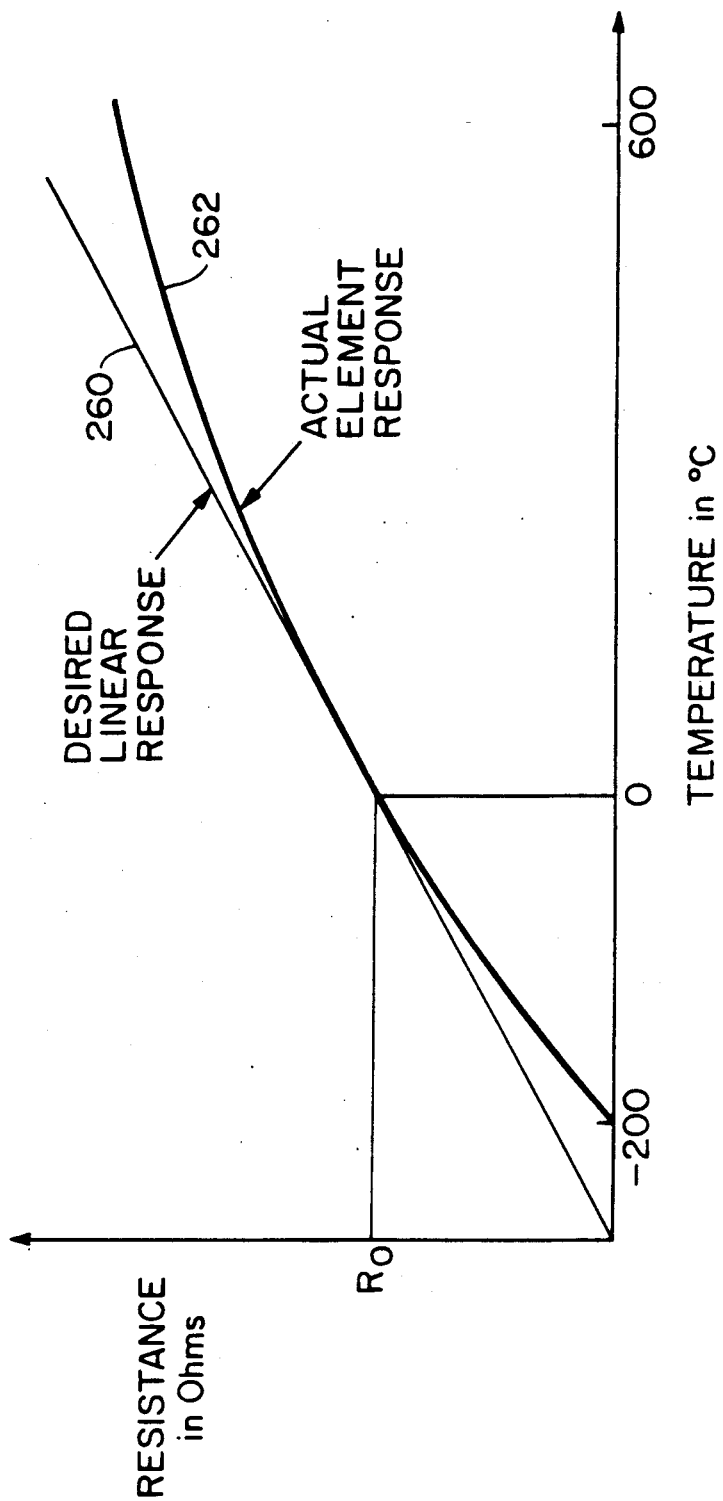
FIG. 9 is a graph illustrating the temperature sensing element linearity error and compensation.

First, A/D converter 52 is calibrated for zero and full-span, step 202. This sets the zero and maximum deflection values for the calibration. Next, A/D converter 52 self-corrects for zero and full-span temperature drift step 204. This is accomplished by correcting the data using the stored measurement obtained from the last cycle of operation of switch 220 in buffer 50. Next, A/D converter 52 is self-corrected for linearity, step 206. Preferably, A/D converter 52 would have a linear characteristic 250, FIG. 8, but practically its characteristic is nonlinear as indicated at 252 in FIG. 8. A mathematically derived corrective function 254 is therefore combined with the nonlinear output 252 to obtain a resultant ideal, or close to the ideal, characteristic 250. Following this, the temperature measurement is digitally filtered, step 208, and then the characteristic coefficient of correction for the sensing element or platinum wire is achieved, step 210, as shown in FIG. 9, where the idealized linear response characteristic 260 is shown as a straight line while the actual response of the temperature sensing element is indicated at 262. The difference between the idealized and actual characteristic is noted and the difference is applied to produce the correct reading. At this point, a fully corrected, calibrated and compensated signal representative of the resistance sensed is available. This value is then fed to one or more of the scale evaluation algorithms 212, 214 and 216. These are standardized scales which define temperature reading such as the International Practical Temperature Scale of 1948, the International Practical Temperature Scale of 1968, or the proposed International Temperature Scale of 1990, respectively. Following this, the temperature may be expressed in any desired units 218 such as Celsius, Fahrenheit or Kelvin, and then stored, 219, for subsequent transmission. The cycle repeats itself continuously so that there is always present in storage the latest temperature sensed ready for immediate transmission upon request.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An integrated digital standardized precision thermometer comprising:
   a sheath including a temperature sensing element;
   a handle, physically interconnected with said sheath and housing an integrated digital standardized thermometer circuit including:
   an analog to digital converter responsive to said temperature sensing element for converting an analog signal representative of the resistance of the sensing element, to a digital signal representative of the resistance of the sensing element;
   said analog to digital converter including a buffer circuit for correcting said digital signal; and
   a microcomputer, responsive to said digital signal representative of the resistance of said sensing element for conversion to a standardized temperature scale.

2. The thermometer of claim 1 in which said analog to digital converter includes a dual-slope integrator and means for determining the period of the dual slope output.

3. The thermometer of claim 1 in which said buffer circuit includes means for measuring the signal across a ratiometric circuit for compensating for current changes through the temperature sensing element.

4. The thermometer of claim 1 in which said buffer circuit includes means for measuring the signal across the terminals and conductors interconnecting said thermometer circuit and said temperature sensing element to determine parasitic thermoelectric error in said terminals and conductors.

5. The thermometer of claim 2 in which said buffer circuit includes means for measuring the signal representative of the ambient temperature at said standardized thermometer circuit in said handle for determining temperature drift.

6. The thermometer of claim 2 in which said microcomputer includes means for enabling said analog to digital converter to begin the dual slope period.

7. The thermometer of claim 2 in which said microcomputer includes means for accumulating a count during the period of said dual slope.

8. The thermometer of claim 1 in which said microcomputer includes means for linearizing the output of said analog to digital converter.

9. The thermometer of claim 1 in which said microcomputer includes means for calibrating said analog to digital converter for zero and span.

10. The thermometer of claim 5 in which said microcomputer includes means, responsive to said signal representative of the ambient temperature, for correcting for the zero and span drift of said analog to digital converter.

11. The thermometer of claim 1 in which said microcomputer includes means for storing a coefficient of correction for said temperature sensing element.

12. The thermometer of claim 1 in which said microcomputer includes means for storing an identification address of the integrated digital standardized precision thermometer.

13. The thermometer of claim 1 in which said temperature sensing element is a platinum wire.

14. The thermometer of claim 1 in which said handle is approximately in the range of two to eight inches long and three quarters of an inch to three inches in width.

15. The thermometer of claim 1 in which said microcomputer includes a digital communications interface.

16. The thermometer of claim 15 in which said digital communication interface includes a digital interface connector.

17. The thermometer of claim 16 in which said digital interface connector includes an RS-232C connector.

18. The thermometer of claim 1 in which said microcomputer includes means for converting the sensed temperature into one of a number of predetermined units of temperature.

* * * * *